(12) United States Patent
Gallagher

(10) Patent No.: US 8,696,040 B2
(45) Date of Patent: Apr. 15, 2014

(54) COUPLING FOR PVC PIPING SECTIONS

(76) Inventor: Anthony David Gallagher, Seven Hills, OH (US)

( * ) Notice: Subject to any disclaimer, the term of this patent is extended or adjusted under 35 U.S.C. 154(b) by 13 days.

(21) Appl. No.: 13/464,705

(22) Filed: May 4, 2012

(65) Prior Publication Data

US 2013/0014851 A1   Jan. 17, 2013

Related U.S. Application Data

(60) Provisional application No. 61/482,399, filed on May 4, 2011, provisional application No. 61/598,901, filed on Feb. 15, 2012.

(51) Int. Cl.
F16L 21/00 (2006.01)

(52) U.S. Cl.
USPC .................. 285/417; 285/31; 285/15

(58) Field of Classification Search
USPC ...................... 285/15, 31, 397, 417
See application file for complete search history.

(56) References Cited

U.S. PATENT DOCUMENTS

| | | | |
|---|---|---|---|
| 261,191 A | 7/1882 | Walker | |
| 526,097 A | 9/1894 | Anderson | |
| 1,277,977 A | 9/1918 | Mann | |
| 1,461,482 A | 7/1923 | Hahn | |
| 2,366,579 A * | 1/1945 | Von Ahrens | 285/22 |
| 2,461,337 A | 2/1949 | Miskimen | |
| 2,770,476 A | 11/1956 | Cleverly | |
| 2,776,151 A | 1/1957 | Narkenrider | |
| 2,902,056 A * | 9/1959 | Bossner | 138/101 |
| 2,933,428 A | 4/1960 | Mueller | |
| 2,968,821 A | 1/1961 | Morin | |
| 3,018,519 A | 1/1962 | Morin et al. | |
| 3,108,826 A | 10/1963 | Black | |
| 3,245,701 A | 4/1966 | Leopold | |
| 3,348,862 A | 10/1967 | Leopold, Jr. et al. | |
| 3,612,584 A | 10/1971 | Taylor | |
| 3,614,137 A | 10/1971 | Jacobson | |
| 3,722,924 A | 3/1973 | Bjornsen | |
| 3,768,841 A * | 10/1973 | Byrne et al. | 285/21.1 |
| 3,819,207 A | 6/1974 | Leopold, Jr. | |
| 3,826,521 A * | 7/1974 | Wilhelmsen | 285/15 |
| 3,858,914 A | 1/1975 | Karie et al. | |
| 3,962,767 A * | 6/1976 | Byerley et al. | 29/890.031 |
| 4,011,652 A | 3/1977 | Black | |
| 4,014,568 A | 3/1977 | Carter et al. | |
| 4,035,002 A * | 7/1977 | Curtin | 285/31 |
| 4,067,072 A | 1/1978 | Izzi | |
| 4,093,280 A | 6/1978 | Yoshizawa et al. | |
| 4,241,878 A | 12/1980 | Underwood | |
| 4,247,136 A * | 1/1981 | Fouss et al. | 285/319 |
| 4,339,406 A | 7/1982 | Underwood | |
| 4,363,504 A | 12/1982 | De Feo et al. | |
| 4,377,894 A | 3/1983 | Yoshida | |
| 4,420,176 A * | 12/1983 | Cornwall | 285/142.1 |
| 4,445,715 A | 5/1984 | Inoue et al. | |

(Continued)

Primary Examiner — Aaron Dunwoody
(74) Attorney, Agent, or Firm — Cindy Murphy LLC

(57) ABSTRACT

A coupling (20) capable of connecting together two piping sections (30, 30) having the same outer diameter, two piping sections (40, 40) having the same inner diameter, or two piping sections (30, 40) having different diameters. The coupling (20) can have a unitary tubular structure and it can be made of the same material and in the same manner as conventional PVC piping. Installation of the coupling (20) during construction of a passageway can be accomplished in same manner as is conventionally accomplished with three distinct types of coupling.

14 Claims, 9 Drawing Sheets

(56) References Cited

U.S. PATENT DOCUMENTS

| | | | |
|---|---|---|---|
| 4,474,381 A * | 10/1984 | Wilkins et al. | 285/14 |
| 4,522,434 A | 6/1985 | Webb | |
| 4,537,426 A | 8/1985 | Carter, Sr. | |
| 4,620,330 A | 11/1986 | Izzi, Sr. | |
| H176 H * | 12/1986 | Johnstone, Jr. | 285/31 |
| 4,660,860 A * | 4/1987 | Todd | 285/12 |
| 4,708,374 A | 11/1987 | Cox | |
| 4,804,209 A | 2/1989 | Fischer | |
| 4,842,540 A | 6/1989 | Endo et al. | |
| 4,858,958 A * | 8/1989 | Harbeke | 285/31 |
| 4,905,766 A | 3/1990 | Dietz et al. | |
| 5,109,929 A | 5/1992 | Spears | |
| 5,152,557 A | 10/1992 | Dierickx | |
| 5,186,500 A | 2/1993 | Folkers | |
| 5,333,650 A | 8/1994 | Folkman | |
| 5,366,257 A | 11/1994 | McPherson et al. | |
| 5,393,103 A * | 2/1995 | Cretzler | 285/31 |
| 5,406,983 A | 4/1995 | Chambers et al. | |
| 5,437,481 A | 8/1995 | Spears et al. | |
| 5,551,141 A | 9/1996 | De'Ath et al. | |
| 5,582,439 A | 12/1996 | Spears | |
| 5,655,299 A | 8/1997 | Lindahl | |
| 5,851,472 A | 12/1998 | Kashiyama | |
| 5,861,120 A | 1/1999 | Yagi et al. | |
| 5,901,987 A | 5/1999 | Godeau | |
| 5,915,736 A | 6/1999 | Marik et al. | |
| 5,954,371 A | 9/1999 | Koke et al. | |
| 6,000,436 A | 12/1999 | Auvil et al. | |
| 6,070,915 A | 6/2000 | Luo | |
| 6,099,975 A | 8/2000 | Peterson et al. | |
| 6,135,508 A | 10/2000 | Genoni et al. | |
| 6,148,581 A | 11/2000 | Separautzki | |
| 6,361,083 B1 | 3/2002 | Riesselmann et al. | |
| 6,378,912 B1 | 4/2002 | Condon et al. | |
| 6,460,432 B1 | 10/2002 | Julian et al. | |
| 6,521,160 B2 | 2/2003 | Suzuki | |
| 6,783,160 B2 * | 8/2004 | Rowley | 285/242 |
| 6,866,305 B2 | 3/2005 | Spears | |
| 6,991,268 B2 | 1/2006 | Spears | |
| 7,017,951 B2 | 3/2006 | Spears | |
| 7,178,557 B2 | 2/2007 | Swingley | |
| 7,237,810 B2 | 7/2007 | Minarovic | |
| 7,455,325 B2 | 11/2008 | Mejlhede et al. | |
| 7,478,840 B2 | 1/2009 | Youssefifar | |
| 7,527,302 B2 | 5/2009 | Lewis et al. | |
| 7,980,602 B2 | 7/2011 | Charlson et al. | |
| 7,988,204 B2 | 8/2011 | Lewis et al. | |
| 8,020,899 B2 | 9/2011 | Hanna et al. | |
| 8,172,275 B2 | 5/2012 | Sumrall, Jr. et al. | |
| 8,444,188 B2 * | 5/2013 | Pucciani | 285/370 |
| 2002/0033599 A1 * | 3/2002 | Robertson | 285/31 |
| 2003/0146620 A1 | 8/2003 | Young et al. | |
| 2004/0222626 B1 * | 11/2004 | Baruh | 285/15 |
| 2005/0062282 A1 | 3/2005 | Rosch et al. | |
| 2005/0134045 A1 * | 6/2005 | Mohan et al. | 285/370 |
| 2008/0143102 A1 | 6/2008 | Graybeal | |
| 2009/0146413 A1 | 6/2009 | Golan | |
| 2011/0056581 A1 | 3/2011 | Diels et al. | |

* cited by examiner

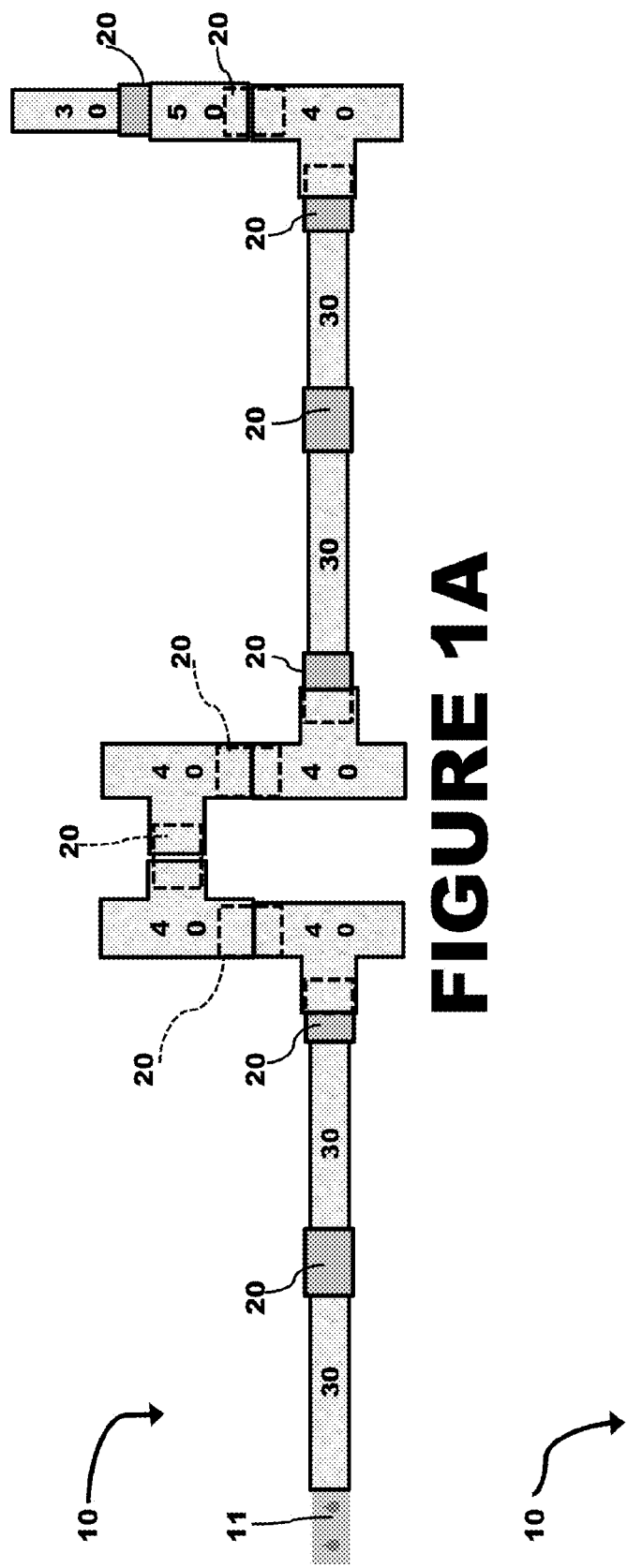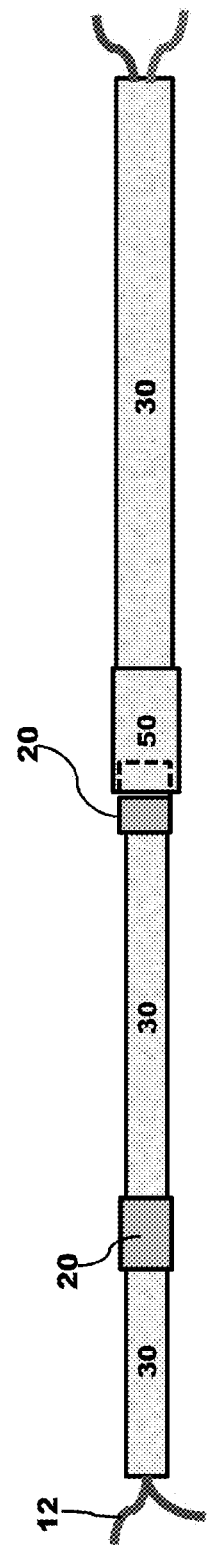

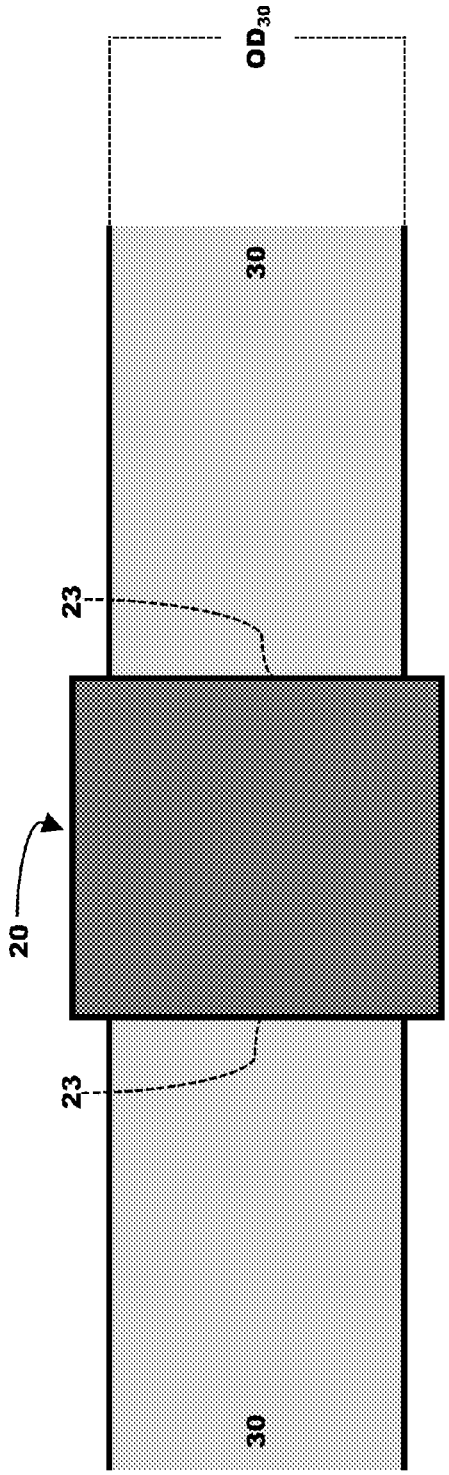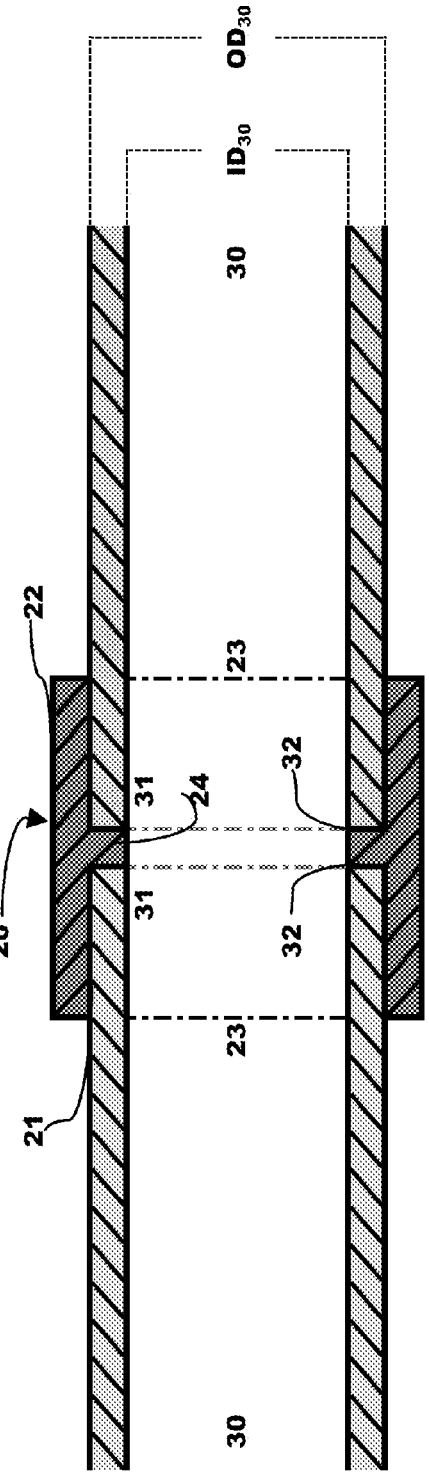

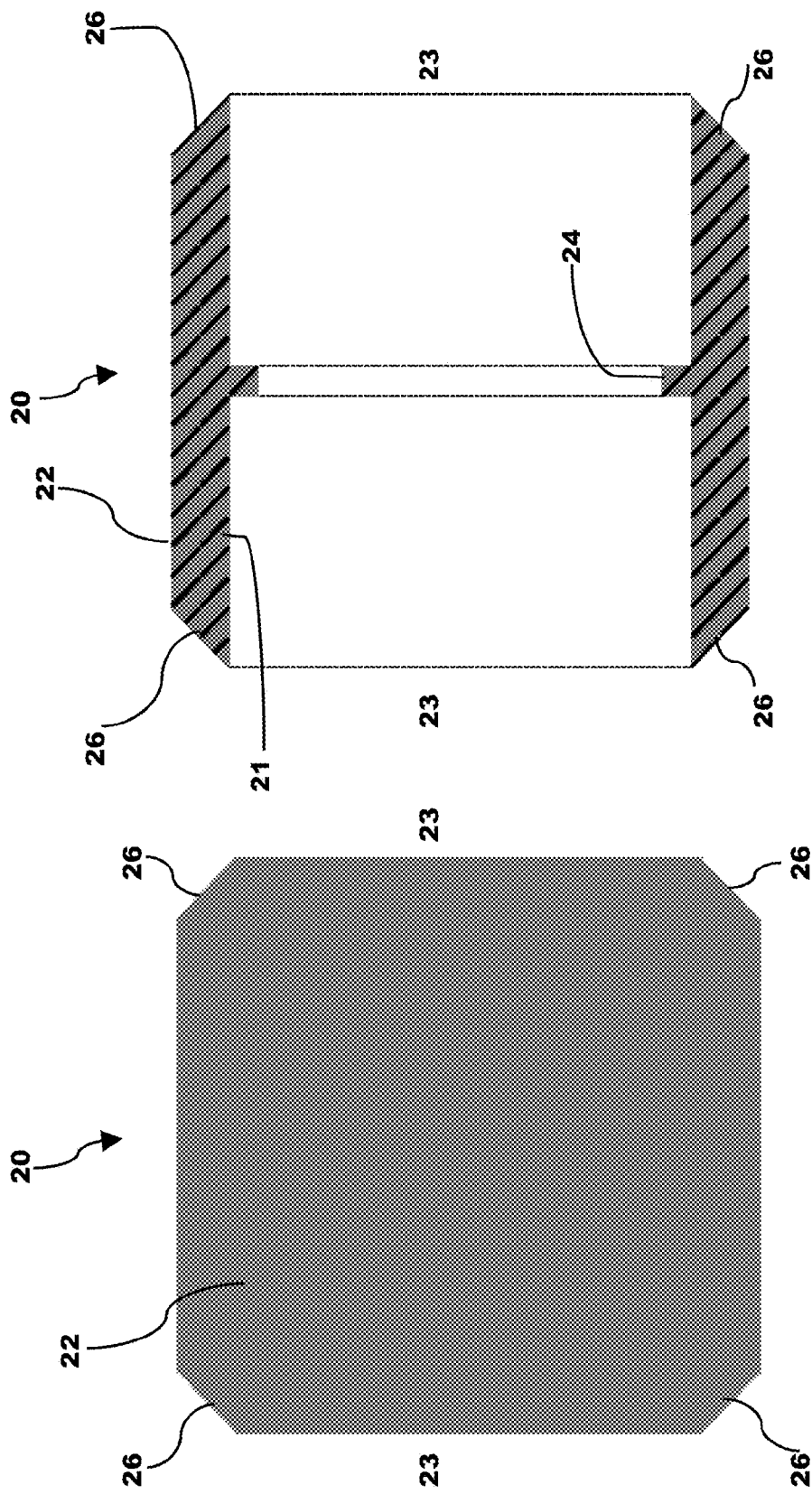

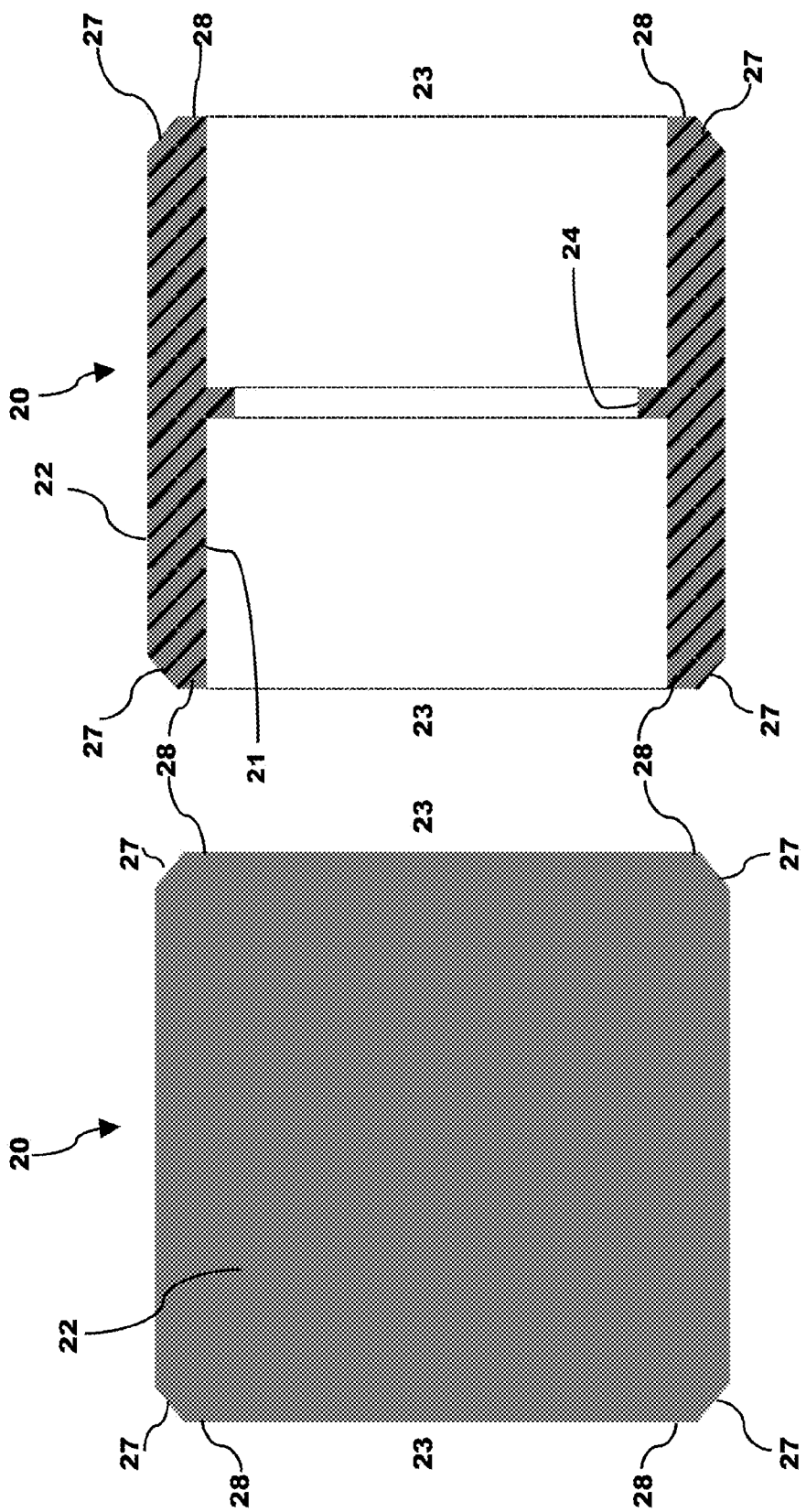

COUPLING FOR PVC PIPING SECTIONS

RELATED APPLICATION

This application is related to U.S. Provisional Patent Application No. 61/482,399 filed on May 4, 2011 and U.S. Provisional Patent Application No. 61/598,901 filed on Feb. 15, 2012. The entire disclosures of these provisional patent applications are hereby incorporated by reference.

BACKGROUND

In the construction industry and other applications, PVC sections are commonly used to construct conduits that serve as piping for water, drain, sewer, and/or other fluid lines. They are also used to construct conduits that serve as tunnels for wires, cables, and/or other electrical lines. PVC sections are typically supplied in an assortment of shapes, (e.g., straight, curved, elbow, tri-port, etc.), ranging lengths, and/or varying diameters. Depending upon the particular PVC sections being joined, different types of coupling are used.

SUMMARY

A coupling is provided that can be used to connect different types of PVC sections together when constructing conduits for fluid lines, electrical lines, or other purposes. With this unitary tubular body, the number of coupling types which must be sold, stocked, stored, and/or supplied can be reduced. The coupling can be made in much the same manner as conventional PVC-section couplers. And the coupling can be used to connect PVC sections in a conventional manner (e.g., with a primer and cement), whereby it does not add any additional cost or complexity to a construction project.

DRAWINGS

FIG. 1A shows a passageway 10 for fluid lines comprising a series of PVC sections and a plurality of couplings connecting them together.

FIG. 1B shows a passageway 10 for electrical lines comprising a series of PVC sections and a plurality of couplings connecting them together.

Figures 2A, 2B, 2C:
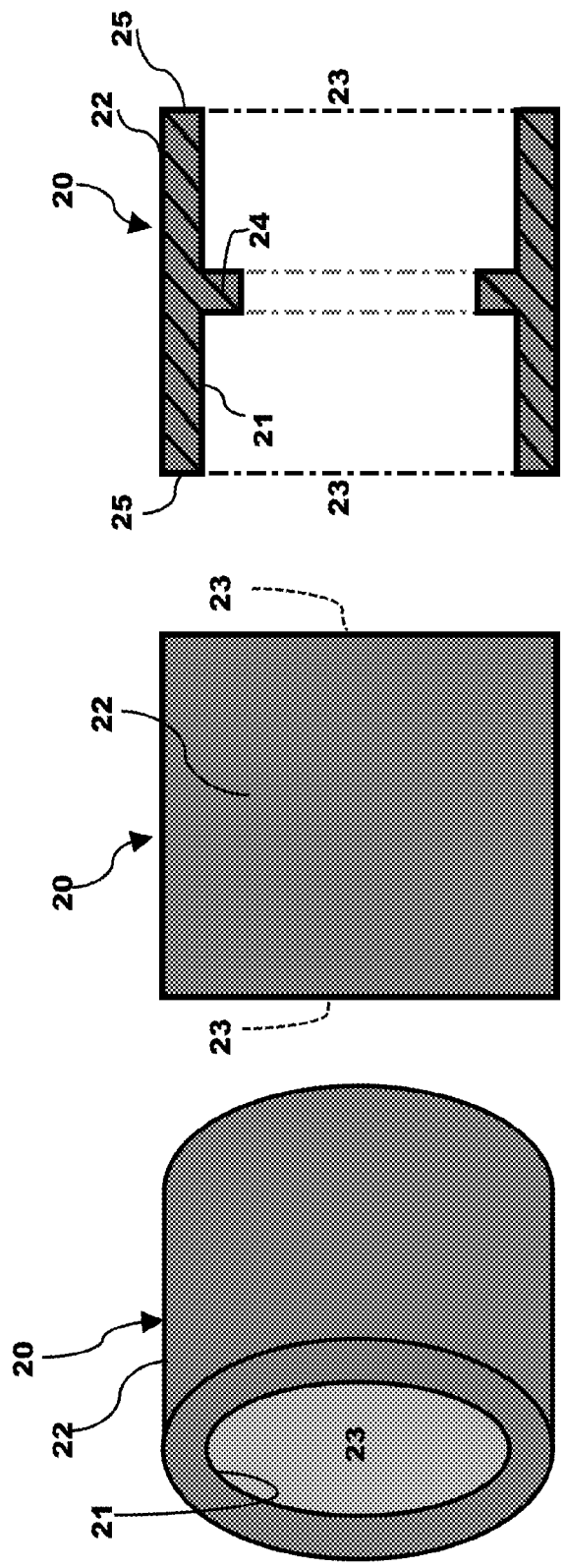
FIGS. 2A-2C show the coupling 20.

FIGS. 3A-3B, FIGS. 4A-4B, and FIGS. 5A-5D show the coupling 20 connecting together different types of the sections.

FIGS. 6A-6B, FIGS. 7A-7B, and FIGS. 8A-8B show some other possible versions of the coupling 20.

DESCRIPTION

Referring now to the drawings, and initially to FIG. 1, a passageway 10 is shown in which couplings 20 are used to connect sections 30 and 40 together. The passageway 10 shown in FIG. 1A could be, for example, a passageway wherein the sections 30 and 40 are used to convey water, air, or another fluid in a desired flow pattern. The passageway 10 shown in FIG. 1B could be, for example, a passageway where the sections 30 and 40 are used as housing tunnels for wires, cables, and/or other electrical lines.

In either or any case, the same coupling 20 is used to connect together a section 30 with another section 30, a section 40 with another section 40, and a section 30 with a section 40. In certain connections, an adapter section 50 may also be necessary.

The coupling 20 is shown in more detail in FIGS. 2A-2C. The coupling 20 is a unitary tubular body comprising an inner cylindrical wall 21, an outer cylindrical wall 22, and open axial ends 23. An interior stop surface 24 projects inwardly from the inner wall 21 and this stop can comprise a circular ridge situated approximately intermediate the axial ends 23.

In FIGS. 3A-3B, the coupling 20 is shown connecting together a section 30 with another similar section 30, wherein each section 30 is of the straight-cylindrical type. Each section 30 has a connecting end portion 31 having an exposed edge 32, and the connecting end portion 31 has an inner diameter $ID_{30}$ and an outer diameter $OD_{30}$. The coupling 20 receives, through each of its axial ends 23, the connecting edge portions 31 of the sections 30. And the sections' edges 32 are abutted against opposite sides of the coupling's interior stop surface 24. Thus, the coupling's inner cylindrical wall 21 is sized to tightly receive the sections' connecting edge portions 31. And the coupling's interior stop 24 is situated to reside next to the connecting edge portions 31 when the sections 30 are fully inserted.

Figure 4B:
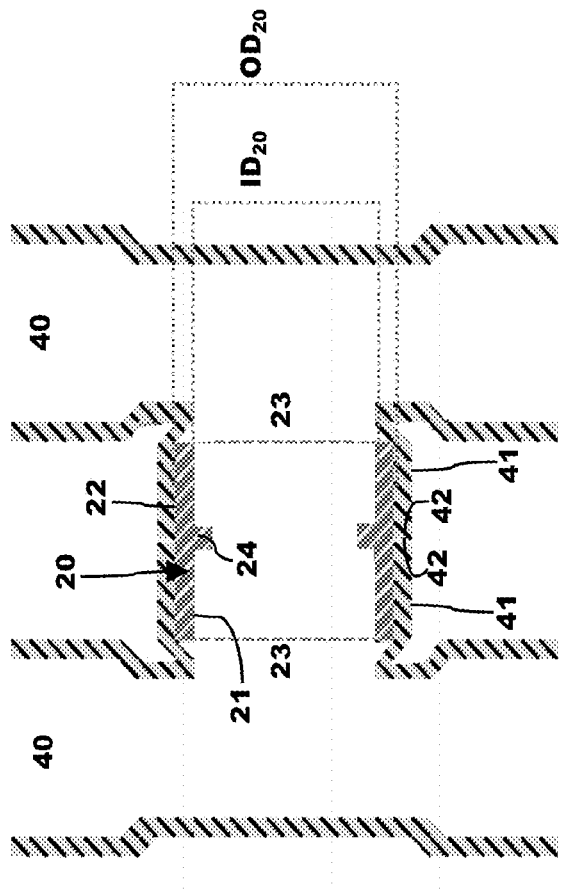
Figure 4A:
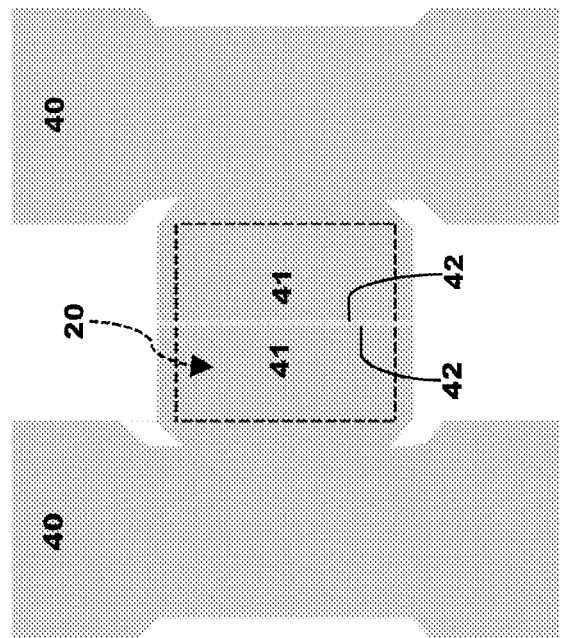

In FIGS. 4A-4B, the coupling 20 is shown connecting together a section 40 with another section 40, wherein both are of the tri-port type. Each section 40 has a connecting end portion 41 having an exposed edge 42 and an interior stop surface 43. In the illustrated embodiment, the sections 40 are three-way-tee fittings with their relevant connecting end portions 41 being oriented perpendicular to their other connecting ends. The stop surface 43 can take the form of a tapered shoulder extending radially inward.

The connecting end portion 41 has an inner diameter $ID_{40}$ and an outer diameter $OD_{40}$. The inner diameter $ID_{40}$ of the section 40 is unequal to (e.g., greater than) the inner diameter of the section 30. The connecting end portions 41 are received over respective axial ends 23 of the coupling 20 and their exposed edges 42 can abut against each other. The exterior stop surfaces 24 of the coupling 20 can abut against the interior stop surfaces 43 of the sections 40. Thus, the coupling's outer cylindrical wall 22 is sized to tightly receive the sections' connecting edge portions 41. And the coupling's exterior stop 24 is situated to reside next to their interior stop surfaces 43.

Figure 5B:
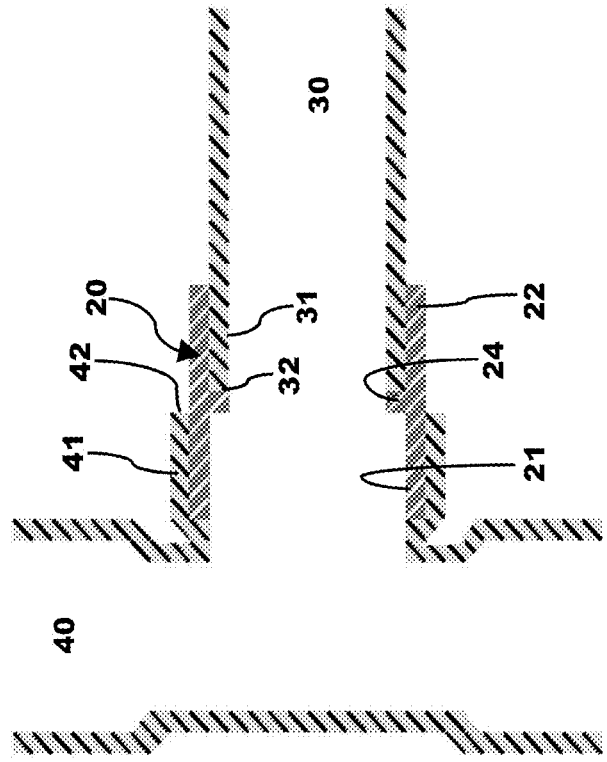
Figure 5A:
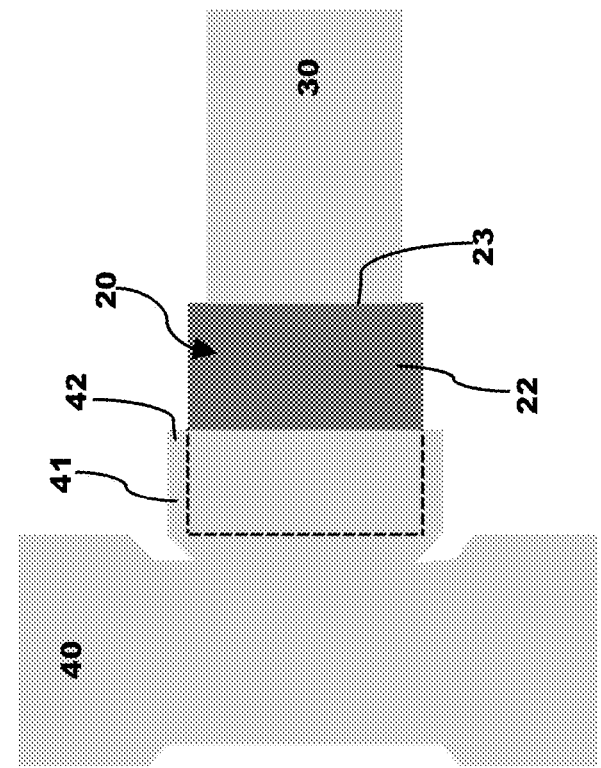

In FIGS. 5A-5B, the coupling 20 is shown connecting together a section 30 and a section 40, wherein the section 30 is of the straight cylindrical type and the section 40 is of the tri-port type. The connecting end 31 of the piping section 30 is inserted into one axial end 23 of the coupling 20 and its edge 33 is abutted against the coupling's interior stop 24. The opposite axial side of the coupling 30 is inserted into the connecting end 41 of the PVC section 40 and its exterior stop 24 is abutted against the section's interior stop 43.

Figure 5C:
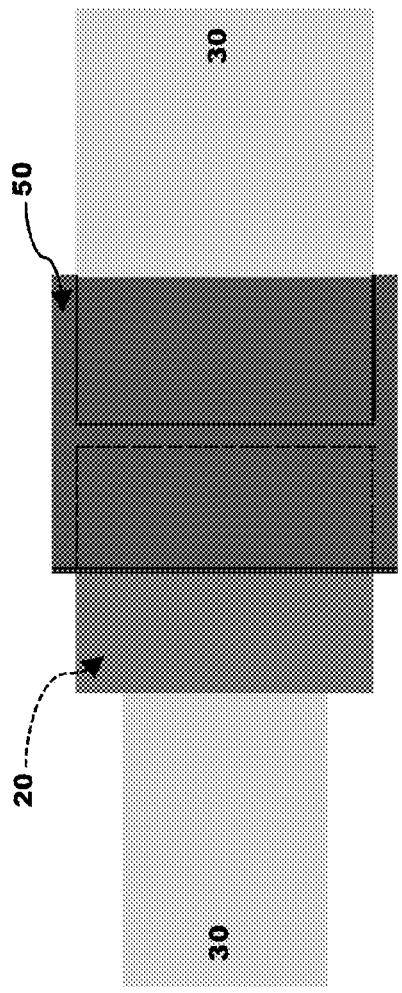
Figure 5D:
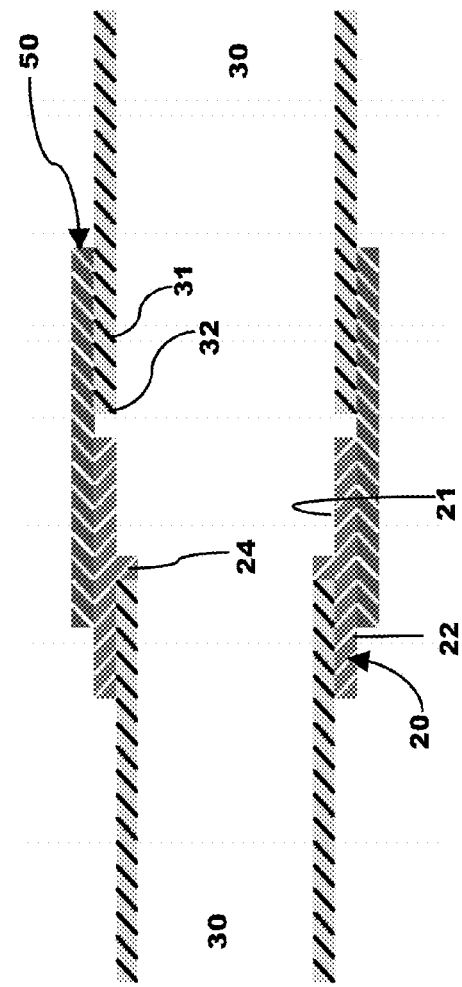

In FIGS. 5C-5D, the coupling 20 is shown connecting together a section 30 and another section 30, wherein both sections 30 are of the straight cylindrical type. In these embodiments, an adapter section 50 is interposed between the coupling 20 and the other section 30.

Figures 8A, 8B:
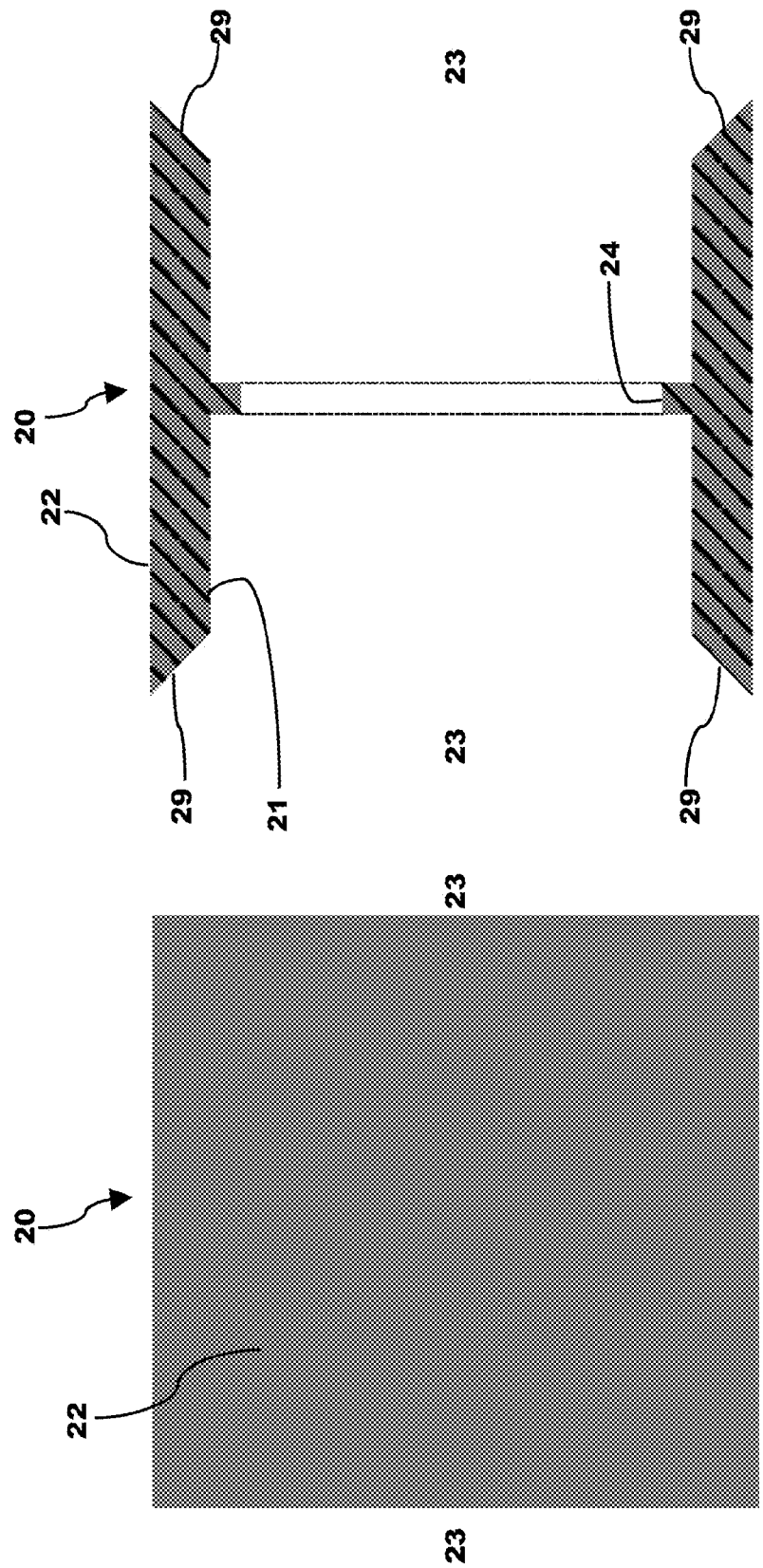

Referring back to FIGS. 2A-2C, the edge of each axial end 23 of the coupling 20 can be a flat 25 extending substantially perpendicularly between the inner wall 21 and the outer wall 22. As shown in FIGS. 6A-6B, the edge can instead be an outwardly tapering shoulder 26. As shown in FIGS. 7A-7B, the axial edge can comprise an axially tapering shoulder 27 in combination with an inward flat 28. And as shown in FIGS. 8A-8B, the axial edge can be an inwardly tapering shoulder 29.

The couplings 20, the piping sections 30, the piping sections 40, and/or the adapter sections 50 may be made of any suitable material. In recent years, polyvinylchloride (PVC, UPVC, CPVC, etc.) piping has gained so much popularity in the construction industry that it seems to have become the almost exclusively used piping material. PVC (polyvinyl chloride), UPVC (unplasticized polyvinyl chloride), and CPVC (chlorinated polyvinyl chloride) are all strong, rigid, and resistant to a variety of acids and bases. UPVC is further formulated to fight the effects of ultra-violet light and CPVC is further formulated to handle higher temperatures.

That being said, the coupling 20 and the sections need not be made of PVC, as other plastic (e.g., polypropylene (PP), acrylonitrile-butadienestyrene (ABS), polyamide (PA), polyethylene (PE)) and/or non-plastic materials may also be suitable candidates.

The coupling 20 can be conformed to manufacturing schedules so as to meet the needs of a broad range of industrial, commercial, and residential systems. Typical dimensions for such schedules are indicated in the tables below.

| Schedule 40 | | |
| --- | --- | --- |
| Pipe Size (inches) | ID (inches) | OD |
| ½ | 0.840 | 0.622 |
| ¾ | 1.050 | 0.824 |
| 1 | 1.315 | 1.049 |
| 1¼ | 1.660 | 1.380 |
| 1½ | 1.900 | 1.610 |
| 2 | 2.375 | 2.067 |
| 2½ | 2.875 | 2.469 |
| 3 | 3.500 | 3.068 |
| 4 | 4.500 | 4.026 |
| 5 | 5.563 | 5.047 |
| 6 | 6.625 | 6.065 |
| 8 | 8.625 | 7.981 |
| 10 | 10.750 | 10.020 |
| 12 | 12.750 | 11.938 |
| 14 | 14.000 | 13.124 |
| 16 | 16.000 | 15.000 |

| Schedule 80 | | |
| --- | --- | --- |
| Pipe Size (inches) | OD (inches) | ID (inches) |
| ½ | 0.840 | 0.546 |
| ¾ | 1.050 | 0.742 |
| 1 | 1.315 | 0.957 |
| 1¼ | 1.660 | 1.278 |
| 1½ | 1.900 | 1.500 |
| 2 | 2.375 | 1.939 |
| 2½ | 2.875 | 2.323 |
| 3 | 3.500 | 2.900 |
| 4 | 4.500 | 3.826 |
| 5 | 5.563 | 4.813 |
| 6 | 6.625 | 5.761 |
| 8 | 8.625 | 7.625 |
| 10 | 10.750 | 9.564 |
| 12 | 12.750 | 11.376 |
| 14 | 14.000 | 12.500 |
| 16 | 16.000 | 14.314 |

| Schedule 120 | | |
| --- | --- | --- |
| Pipe Size (inches) | OD (inches) | ID (inches) |
| ½" | .840 | .480 |
| ¾" | 1.050 | .690 |
| 1" | 1.315 | .891 |
| 1¼" | 1.660 | 1.204 |
| 1½" | 1.900 | 1.423 |
| 2" | 2.375 | 1.845 |
| 2½" | 2.875 | 2.239 |
| 3" | 3.500 | 2.758 |
| 4" | 4.500 | 3.574 |
| 6" | 6.625 | 5.434 |
| 8" | 8.625 | 7.189 |

The coupling 20 can be adapted to accommodate a wide range of section dimensions as well, assuming that there is enough diameter variance to allow for a suitable wall thickness in the coupling 20. For example, the coupling 20 can be adapted to accommodate sections 30 having a pipe size of ½ inch and sections 40 having a pipe size ¾ inch; sections 30 having a pipe size ¾ inch and sections 40 having a pipe size 1 inch; sections 30 having a pipe size of 1 inch and sections 40 having a pipe size of 1¼ inch; sections 30 having a pipe size of 1¼ inch and sections 40 having a pipe size of 1½ inch; sections 30 having a pipe size of 1½ inch and sections 40 having a pipe size of 2 inches; sections 30 having a pipe size of 2 inches and sections 40 having a pipe size of 4 inches, etc.

One may now appreciate that the coupling 20 can be used to connect different types of sections together whereby inventory can be reduced. Although the passageway 10, the coupling 20, the piping section 30, and/or the piping section 40, have been shown or described with respect to certain embodiments, it is obvious that equivalent alterations and modifications will occur to others skilled in the art upon the reading and understanding of this specification and the annexed drawings.

The invention claimed is:

1. A coupling (20) comprising a unitary tubular body having an inner cylindrical wall (21) having a diameter D21, an outer cylindrical wall (22) having a diameter D22, and open axial ends (23), and a stop (24) comprising a circular ridge projecting radially inward from the inner cylindrical wall (21); wherein the diameter D21 and the diameter D22 are selected from a group consisting of:

the diameter D21 is 0.840 inches and the diameter D22 is 1.050 inches, the diameter D21 is 1.050 inches and the diameter D22 is 1.315 inches, the diameter D21 is 1.315 inches and the diameter D22 is 1.660 inches, the diameter D21 is 1.660 inches and the diameter D22 is 1.900 inches, the diameter D21 is 1.900 inches and the diameter D22 is 2.375 inches, the diameter D21 is 2.375 inches and the diameter D22 is 2.875 inches, the diameter D21 is 2.875 inches and the diameter D22 is 3.500 inches, the diameter D21 is 4.000 inches and the diameter D22 is 4.500 inches, the diameter D21 is 4.500 inches and the diameter D22 is 5.563 inches, the diameter D21 is 5.563 inches and the diameter D22 is 6.625 inches, the diameter D21 is 6.625 inches and the diameter D22 is 8.625 inches, the diameter D21 is 8.625 inches and the diameter D22 is 10.750 inches, the diameter D21 is 10.750 inches and the diameter D22 is 12.750 inches, the diameter D21 is 12.750 inches and the diameter D22 is 14.000 inches, and the diameter D21 is 14.000 inches and the diameter D22 is 16.000 inches.

2. A coupling (20) as set forth in claim 1, wherein the unitary tubular body is made of plastic.

3. A coupling (20) as set forth in claim 1, wherein the unitary tubular body is made of polyvinylchloride.

4. A coupling (20) as set forth in claim 1, wherein the unitary tubular body is made of acrylonitrile-butadienestyrene (ABS).

5. A passageway (10) comprising a coupling (20) as set forth in claim 1, a first pipe (30), and a first fitting (40); wherein the coupling (20) receives, through one of its axial ends (23), a connecting edge portion (31) of the first pipe (30); and wherein the coupling (20) receives, over the other of its axial ends (23), a connecting edge portion (41) of the first fitting (40).

6. A passageway (10) as set forth in claim 5, wherein the coupling (20) is made of polyvinylchloride.

7. A passageway (10) as set forth in claim 5, wherein the coupling (20) is made of acrylonitrile-butadienestyrene.

8. A passageway (10) comprising a coupling (20) as set forth in claim 1, a first pipe (30) and a second pipe (30); wherein the coupling (20) receives, through one its axial ends (23), a connecting edge portion (31) of the first pipe (30); and wherein the coupling (20) receives, through the other of its axial ends (23), a connecting edge portion (31) of the second pipe (30).

9. A passageway (10) as set forth in claim 8, wherein the coupling (20) is made of polyvinylchloride.

10. A passageway (10) as set forth in claim 8, wherein the coupling (20) is made of acrylonitrile-butadienestyrene.

11. A passageway (10) comprising a coupling (20) as set forth in claim 1 and piping sections (30, 40) coupled together by the coupling (20), wherein the piping sections (30, 40) convey a fluid (11).

12. A passageway (10) as set forth in claim 11, wherein the coupling (20) is made of polyvinylchloride.

13. A passageway (10) comprising a coupling (20) as set forth in claim 1 and piping sections (30, 40) coupled together by the coupling (20), wherein the piping sections (30, 40) house electrical lines (12).

14. A passageway (10) as set forth in claim 13, wherein the coupling (20) is made of acrylonitrile-butadienestyrene.

* * * * *